March 28, 1944.   M. J. WEISS   2,345,226
FLAX CLEANING MACHINE
Original Filed Feb. 27, 1929
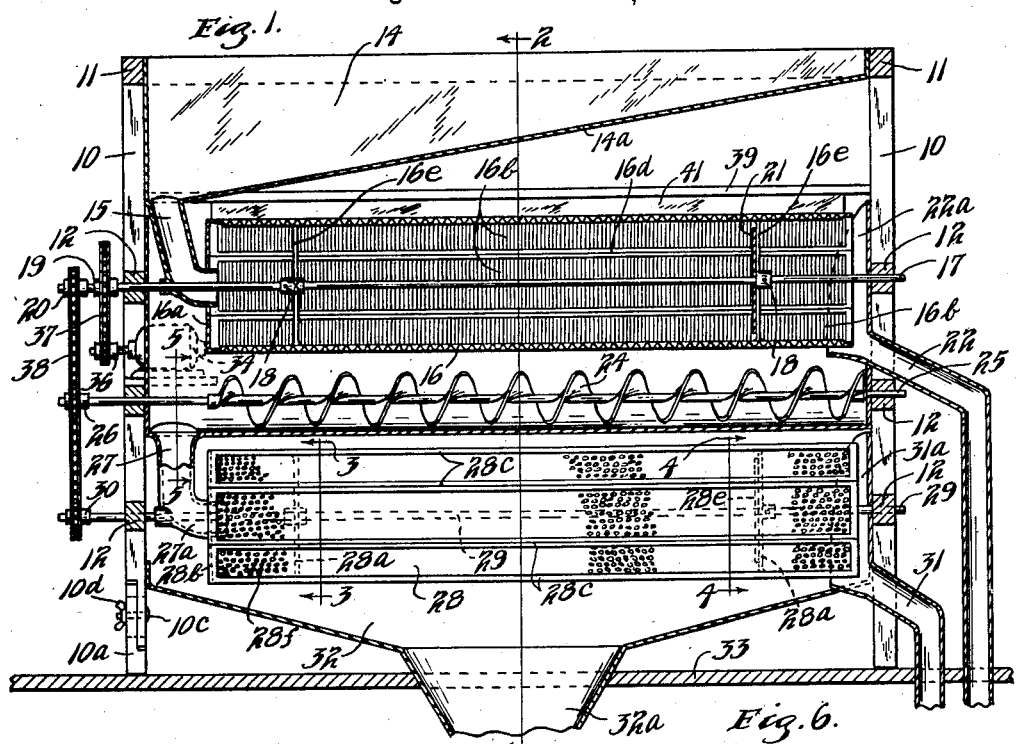
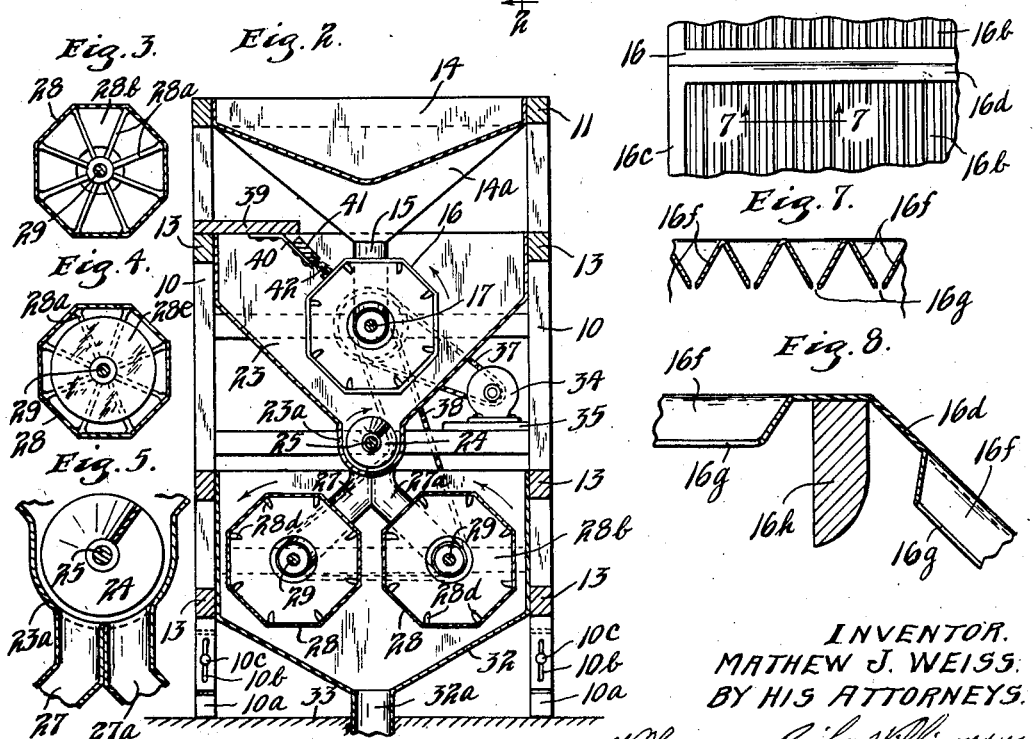
INVENTOR.
MATHEW J. WEISS.
BY HIS ATTORNEYS.

Patented Mar. 28, 1944

2,345,226

UNITED STATES PATENT OFFICE 2,345,226

FLAX CLEANING MACHINE

Mathew J. Weiss, Minneapolis, Minn.

Refiled for abandoned application Serial No. 343,023, February 27, 1929. This application May 5, 1941, Serial No. 391,938

6 Claims. (Cl. 209—289)

This invention relates to a machine for cleaning grain for seed, and while the machine is capable of cleaning various kinds of grain, it particularly is designed for cleaning flax. When flax is threshed it ordinarily contains quite a few foreign seeds, such as water-grass, mustard-seed and the seeds of wild peas or vetch, garlic and wild oats. It is desirable to clean the flax of these foreign seeds before the same is marketed.

It is an object of my invention, therefore, to provide a simple and efficient machine which will quickly and effectively separate the flax from the foreign seeds and one which will have a large capacity.

It is a further object of the invention to provide a machine for separating flax or other grains from foreign seeds, comprising a revolvable member of polygonal shape having in the walls thereof transversely extending slots and having at the corners inwardly extending baffle and lifting plates.

It is also an object of the invention to provide a machine for cleaning flax or other grain from foreign seeds, having a revolvable container with transversely extending slits therein, through which the flax is adapted to pass, in combination with a second revolvable container or screen having holes of smaller diameter than the width of said slits.

These and other objects and advantages of the invention will be fully set forth in the following description made in connection with the accompanying drawing, in which like reference characters refer to similar parts throughout the several views and in which—

Figure 1 is a central vertical longitudinal section through the machine;

Fig. 2 is a vertical section taken on line 2—2 of Fig. 1, as indicated by the arrows;

Fig. 3 is a vertical section taken on line 3—3 of Fig. 1 as indicated by the arrows;

Fig. 4 is a vertical section taken on line 4—4 of Fig. 6 as indicated by the arrows;

Fig. 5 is a vertical section taken on line 5—5 of Fig. 1 as indicated by the arrows;

Fig. 6 is a partial plan of the inner side of one screen member used;

Fig. 7 is a vertical section taken on line 7—7 of Fig. 6 shown on an enlarged scale;

Fig. 8 is a section through a corner of one screen used and shown on a still more enlarged scale.

Referring to the drawing, a machine is shown having a frame comprising corner posts 10 arranged at the corners of a rectangle and connected at their top by cross members 11 extending therebetween, said members also having other cross members 12 extending between the end posts and the ends or short sides of the rectangle and intermediate members 13 extending between the posts 10 and the long sides of the rectangle. The members 10 at one end of the frame have lower end portions 10a separate from and arranged in rabbeted relation to the upper portions of member 10. Said portions 10a have vertically extending elongated slots 10b through which extend the headed bolts 10c extending through the upper portions of member 10. Wing nuts 10d are threaded on the bolts 10c and clamp the portions 10a to the upper portions of member 10.

The said frame has at its upper portion a hopper 14 having a bottom 14a sloping towards one end, said bottom having an opening at one end from which leads a conduit 15. The lower end of conduit 15 is directed substantially horizontally and extends through the end wall 15a of a screen container 16. While container 16 might be of various shapes in cross section, in the embodiment of the invention illustrated, it is shown as polygonal and specifically in the form of an octagon. As illustrated, member 16 comprises a periphery made of panels 16b, each of which has an end strip or flange 16c and longitudinal sides or flanges 16d. The panels 16 are supported on spaced spiders 16e having radially extending arms and central hubs, which hubs are secured to a shaft 17 by any suitable means, such as set screws 18. Shaft 17 has its ends journaled respectively in a pair of the members 12 and has secured at one end, outside of one of the members 12, a sprocket 19 and also has secured thereto outside of sprocket 19 another sprocket 20. The panels 16 having extending between the longitudinal sides 16d transverse inwardly directed ribs 16f, said ribs having converging sides and being shown as substantially of V shape in cross section. A split or opening 16g extends between the inner edges of the side of the ribs 16f as shown in Figs. 6 and 7. Inwardly extending plates 16h are provided secured to one of the sides 16d of each panel and extending at right angles thereto. One side of the plate 16 is flat and the other side, adjacent its inner end, is convex, as shown by Figure 8. A circular plate 21 is secured against the spider 16e which is located nearest the right-hand end of member 16, as seen in Fig. 1. The end member 16 opposite the conduit 15 extends into the flared and enlarged end 22a of a conduit 22, which extends outwardly between the frame members 10 and downwardly at one end thereof. A casing 23 extends at each side of screen 16 and at one end thereof, the same having downwardly converging sides merging into the sides of a semi-cylindrical trough 23a forming the bottom of said casing. A helical conveyor 24 is disposed in the trough 23a, the same being carried on a shaft 25 journaled at its end to a pair of members 12. Said shaft extends at one end of the frame and has secured thereto a sprocket wheel 26. Conduits 27 communicate at their upper ends with an opening at one end of casing 23 and have downwardly extending diverging portions, said portions having their lower ends directed horizontally and into the ends of screen members 28. While the screen members 28 might be of various shapes in cross section, in the embodiment of the invention illustrated, they are shown as of polygonal shape and specifically in the form of an octagon. The screen members 28 each comprise a pair of spider members 28a having hubs secured to 29 respectively, said shafts being journaled to a pair of the members 12 and extending through bearings in the portions of conduits 27, said shafts extending at one end of the frame members 10 and having secured thereto respectively sprockets 30. The members 28 are each formed of eight panels having end portions or flanges 28b and longitudinal side portions or flanges 28c. Between the ends and sides 28 and 28c extend perforated screen material, such as metal, the same being provided with a plurality of small holes 28f, the same having a smaller diameter than the width of the openings 15g. Circular plates 28e are secured to the spider members 28a adjacent the ends of members 28 opposite conduits 27. Inwardly extending baffle plates 28d are provided extending at right angles to one of the side portions 28c and longitudinally thereof, the same being of a shape shown by the plates 15h in Fig. 8. The ends of members 28 opposite conduit 27 are received in the enlarged flaring end 31a of the conduit 31, which extends outwardly between frame members 10 and downwardly at one end thereof. The members 28 are inclosed at the sides and between a casing 32 having downwardly inclined sides which terminate in the sides of the chute 32a extending from casing 32. The frame members 10 are shown as resting on a floor 33 and conduits 22 and 31 and chute 32a are shown as extending through this floor. The material passing through said conduits and chute may be received in suitable receptacles on the floor below the floor 33.

A motor 34 is mounted on a plate or platform 35 carried by one of the members 12, the shaft of which is secured by a sprocket 36. A chain 37 runs over sprocket 19 on shaft 17 and sprocket 36. Another chain 38 runs over sprocket 20 downwardly, around and beneath sprockets 30 on shafts 29 upwardly around one side of sprocket 26, shafts 25 and 29 thus being driven from shaft 17. A plate 39 extends along one of the members 13, and has sprocket 40 secured to its underside to which is secured a plate 41 carrying a brush or brushes 42 engaging one of the upper sides of member 16.

In operation the material to be cleaned, such as flax, is placed in the hopper 14. Motor 34 will be supplied with suitable current and shaft 17 and member 16 will be driven through the chain 37. For cleaning flax, member 16 is preferably driven from 70 to 80 revolutions per minute and members 28 will be driven at substantially the same speed. The material passes down into container 16 and the same is repeatedly lifted by the plates 16h as the member 16 revolves and discharges against the sides of member 16. The members 10 at one end are preferably adjusted by means of members 10a so that there is a slight slope to the members 16 and 28. The material thus being acted on in member 16, the flax seed eventually passes through the openings 16g and drops into the casing 23. All stems, hulls, large seeds such such as larger mustard seeds and wild peas, as well as any partially hulled weed seeds, pass out at the end of member 16 into the conduit 22 and are discharged therethrough. The flax together with the fine mustard seed, dust and other fine particles of foreign matter, are moved by the conveyor 24 to the conduits 27, and the material passes into said conduits, being substantially equally divided between the same and is directed by said conduits into the members 28. The material in the members 28 is also repeatedly lifted by the baffle plates 28d and then discharged against the sides of said members. The fine seeds and dust pass through the openings in members 28 but these openings are too small to permit the passage of the flax seed. The flax traverses the length of members 28 and is discharged at their ends into conduit 31, from which it will be received into suitable receptacles. The material passing through the screen 28 is received into the casing 32 and is discharged through the chute 32a. The circular plate 21 causes the material to pass around the edge thereof and prevents the material from being too violently thrown out of the end of member 16. Any material tending to stick in the openings 16g is cleared away by the brushes 42. It will be noted that the members 16h and 28d advance with their flat sides moved upwardly so that as they move upwardly a pocket is formed against said flat side and against which the grain is carried upwardly. As these members pass above the centers of members 16 and 28 respectively the grain is discharged or passed off from the baffle members and again falls down on the sides of members 16 and 28 respectively.

From the above description it is seen that the applicant has provided a simple and efficient device for effectively separating flax from foreign material. The machine can be also used for cleaning other grains or seeds by having the proper width to the openings 16g and the proper diameters of holes in the members 28. The parts of the device are comparatively few and simple in construction and the machine can be made at comparatively small expense. The device has been amply demonstrated in actual practice and found to be very successful. Reference is here made to applicant's prior application S. N. 343,023, filed February 27, 1929, on "Flax cleaning machine," of which this application is a refile and a substantial duplicate, said prior application having become abandoned. It will, of course, be understood that various changes may be made in the form, details, proportions and arrangement of the parts, without departing from the scope of applicant's invention, which generally stated, consists in a device capable of carrying out the objects above set forth, in the novel parts and combinations of parts disclosed and defined in the appended claims.

What is claimed is:

1. A flax cleaning machine having in combination, a container rotatable about a longitudinal axis and comprising a peripheral wall having inwardly extending ribs extending transversely of said wall, said ribs having flat inwardly converging sides with an opening between the inner edges of said sides, the flax being adapted to pass through said openings.

2. A flax cleaning machine having in combination, an elongated container rotatable about a longitudinal axis and having a peripheral wall with transversely and inwardly extending V shaped ribs forming troughs at its bottom, the ridges of said ribs being directed inwardly having openings extending lengthwise therefrom and transversely of said axis through which the flax is adapted to pass.

3. A flax cleaning machine comprising a rotatable elongated container of polygonal form, said container having a periphery of panels one for each side of said polygon, said panels having end and side flanges, ribs extending between said side flanges, said ribs having flat inwardly directed converging sides with slits between the inner edges of said sides.

4. A flax cleaning machine having in combination, an upper container, means for delivering material to said container, said container having a peripheral wall with transversely extending ridges with flat sides and having slits therein at their inner sides, a lower container, means for delivering material passing through said slits to said lower container, said lower container having a peripheral wall with a multiplicity of holes therethrough, having a diameter smaller than the width of said slits and means for receiving material delivered at the end of said lower container.

5. A machine for separating flax or other grain from foreign material, having in combination, a hopper, an upper elongated polygonal container having a peripheral wall with solid portions extending longitudinally thereof at corners of said container, V shaped ribs extending transversely of said container between said solid portions, said ribs having their apices directed inwardly and having slits therethrough at their apices, baffle plates extending inwardly at the corners of said container, a lower container of elongated form and polygonal in cross section, rotatable about a longitudinal axis, said lower container having solid portions extending at the corners thereof, and having a multiplicity of holes therethrough between said solid portions, baffle plates extending inwardly at corners of said container and means for directing material passing through said slits in said upper container to said lower container, the diameter of said holes in said lower container being less than the width of said slits in said upper container.

6. A flax cleaning machine having in combination, a rotatable elongated container having substantially flat wall portions, said wall portions being formed of metal and having pressed therein elongated ribs extending transversely of said container and having flat sides inclined to a plane at right angles to the axis of said container, said ribs thus having sides extending inwardly and said ribs having slits therebetween at their meeting inner edges through which flax seeds are adapted to pass flatwise.

MATHEW J. WEISS.